| (12) | United States Patent | (10) Patent No.: | US 12,533,982 B2 |
|---|---|---|---|
| | Shimizu et al. | (45) Date of Patent: | Jan. 27, 2026 |

(54) CHARGE CONTROL SYSTEM FOR ELECTRIC VEHICLE

(71) Applicant: TOYOTA JIDOSHA KABUSHIKI KAISHA, Toyota (JP)

(72) Inventors: Yu Shimizu, Nagakute (JP); Fumiyoshi Kuribara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 779 days.

(21) Appl. No.: 17/963,611

(22) Filed: Oct. 11, 2022

(65) Prior Publication Data

US 2023/0166628 A1 Jun. 1, 2023

(30) Foreign Application Priority Data

Nov. 29, 2021 (JP) ................... 2021-192858

(51) Int. Cl.
*B60L 53/67* (2019.01)
*B60L 53/30* (2019.01)
*B60L 53/302* (2019.01)
*B60L 53/62* (2019.01)
*B60L 53/63* (2019.01)
*B60L 58/24* (2019.01)

(52) U.S. Cl.
CPC ............. *B60L 53/67* (2019.02); *B60L 53/302* (2019.02); *B60L 53/305* (2019.02); *B60L 53/62* (2019.02); *B60L 53/63* (2019.02); *B60L 58/24* (2019.02)

(58) Field of Classification Search
CPC ..................................................... B60L 53/67
USPC .......................................................... 320/109
See application file for complete search history.

(56) References Cited

U.S. PATENT DOCUMENTS

| 2013/0162027 A1* | 6/2013 | Yamamoto ................ B60L 1/02 307/9.1 |
| 2018/0001774 A1* | 1/2018 | Murata .................... B60L 53/50 |
| 2023/0256857 A1* | 8/2023 | Zhou ...................... G06Q 10/02 320/109 |
| 2024/0181918 A1* | 6/2024 | Hanashima ........... H02J 7/0013 |

FOREIGN PATENT DOCUMENTS

| JP | 2016-208639 A | 12/2016 |
| JP | 2018-007428 A | 1/2018 |

* cited by examiner

*Primary Examiner* — Jerry D Robbins
(74) *Attorney, Agent, or Firm* — Dinsmore & Shohl LLP

(57) ABSTRACT

A vehicle includes a power reception unit receiving power from outside of the vehicle, a power storage device, and a control device performing control for charging the power storage device in accordance with a schedule set for timer charge. In the case where a charge time band of a first schedule defining a charge start time and a charge end time and a charge time band of a second schedule defining a charge start time and a charge end time overlap each other, the control device starts charge at the earlier one of the charge start time of the first schedule and the charge start time of the second schedule when the charge start times are different, and ends charge at the later one of the charge end time of the first schedule and the charge end time of the second schedule when the charge end times are different.

12 Claims, 11 Drawing Sheets

CHARGE CONTROL SYSTEM FOR ELECTRIC VEHICLE

CROSS-REFERENCE TO RELATED APPLICATION

This application claims priority to Japanese Patent Application No. 2021-192858 filed on Nov. 29, 2021, incorporated herein by reference in its entirety.

BACKGROUND

1. Technical Field

The present disclosure relates to a vehicle.

2. Description of Related Art

There has conventionally been known a vehicle that can drive an in-vehicle electric load while suppressing an effect on the schedule for timer charge.

Japanese Unexamined Patent Application Publication No. 2016-208639 (JP 2016-208639 A), for example, describes a vehicle that executes control for power reception from a power reception unit such that, when operation of an electric load device is started before a charge start time, the state of charge of a power storage device at the time when operation of the electric load device is started is maintained from the operation start time until the charge start time. When the time for driving the electric load device and the time for timer charge overlap each other, a control device makes a correction so as to advance the charge start time in accordance with the overlapping time.

SUMMARY

Timer charge settings have been diversified. Only a charge start time is set in some cases, and both a charge start time and a charge end time are set in other cases. Occasionally, a scheduled charge time and a my room mode request or a battery temperature rise request overlap each other. In such cases, charging may be performed against the intention of a user not to perform charging, or charging may not be performed against the intention of the user to perform charging.

The present disclosure provides a vehicle that can avoid a situation in which charging is performed, or not performed, against the intention of a user when timer charge setting overlaps a different timer charge setting, a my room mode request from the user, or a request from a vehicle system.

A first aspect of the present disclosure provides a vehicle including: a power reception unit that receives power from an outside of the vehicle; a power storage device; a user input unit that receives setting of a schedule for timer charge; and a control device that controls the timer charge in which the power storage device is charged using the power supplied from the outside of the vehicle in accordance with the schedule that is set. The control device is configured to, in a case where there is overlap between a charge time band of a first schedule that defines a first charge start time and a charge time band of a second schedule that defines a second charge start time and a second charge end time, start charging at an earlier one of the first charge start time and the second charge start time when the first charge start time and the second charge start time are different from each other, and end the charging at a charge end time which is determined based on whether the first schedule defines a first charge end time.

In the vehicle according to the above aspect, the control device may be configured to, in a case where there is overlap between the charge time band of the first schedule that defines the first charge start time and the first charge end time and the charge time band of a second schedule that defines the second charge start time and the second charge end time, end the charging at a later one of the first charge end time and the second charge end time when the first charge end time and the second charge end time are different from each other.

Consequently, it is possible to secure a long charge time at a low rate and seamlessly connect a plurality of charge schedules, and thus to achieve the intention of a user.

In the vehicle according to the above aspect, the control device may be configured to start the charging at a first time when the first charge start time and the second charge start time are same and are the first time, and to end the charging at a second time when the first charge end time and the second charge end time are same and are the second time.

Consequently, it is possible to coordinate two charge schedules in accordance with the intention of the user also when the two charge schedules have the same charge start time.

In the vehicle according to the above aspect, the control device may be configured to, in a case where there is overlap between the charge time band of a first schedule that defines only the first charge start time and the charge time band of a second schedule that defines the second charge start time and the second charge end time, start charging at the first charge start time and execute the charging until the power storage device is fully charged when the first charge start time is earlier than the second charge start time, and start the charging at the second charge start time and end the charging at the second charge end time when the second charge start time is earlier than the first charge start time.

Consequently, it is possible to execute charge in accordance with the schedule intended by the user, since charging is started at a temporally earlier charge start time and changing is ended at the charge end time of the charge schedule that defines the charge start time.

In the vehicle according to the above aspect, the control device may be configured to, in the case where there is overlap between the charge time band of the first schedule that defines only the first charge start time and the charge time band of the second schedule that defines the second charge start time and the second charge end time, start the charging at a first time and end the charging at the second charge end time when the first charge start time and the second charge start time are same and are the first time.

Consequently, it is possible to avoid a situation in which charging will have to be performed at a high rate by continuing charging beyond the second charge end time, even when the first schedule is not selected at the point of the charge start time.

A second aspect of the present disclosure provides a vehicle including: a power reception unit that receives power from an outside of the vehicle; a power storage device; a user input unit that receives setting of a schedule for timer charge; an electric load device; and a control device that controls the timer charge in which the power storage device is charged using the power supplied from the outside of the vehicle in accordance with the schedule that is set. The control device is configured to, when there is a my room mode request that requests use of the electric load device before a charge start time defined by the schedule, start charging and allow operation of the electric load device in accordance with the my room mode request.

Consequently, it is possible to achieve the intention of the user, since the user can use the electric load device immediately after requesting the my room mode.

In the vehicle according to the above aspect, the control device may be configured to control the charging and the operation of the electric load device in accordance with the schedule after the my room mode request is ended.

Consequently, it is possible to achieve the intention of the user exhaustively, since the charge schedule is also taken into consideration while priority is given to the my room mode request.

In the vehicle according to the above aspect, a user input unit may further receive setting of at least one other schedule for timer charge; and the control device may control the timer charge in which the power storage device is charged using the power supplied from the outside of the vehicle in accordance with the schedule and the at least one other schedule that are set. The control device may be configured to: coordinate the schedule and the at least one other schedule for the timer charge; when there is the my room mode request during timer stand-by, execute operation of the electric load device and charging for the operation of the electric load device in accordance with the my room mode request; and when there is a vehicle system request during the timer stand-by, keep the vehicle system request and the charging in a stand-by state; and when there is the vehicle system request during the charging, control the vehicle based on the vehicle system request.

Consequently, it is possible to meet the my room mode request that is a real-time request from the user with the highest priority, the charge according to the timer setting made in advance by the user with the second highest priority, and lastly the vehicle system request that is generated irrespective of the intention of the user.

A third aspect of the present disclosure provides a vehicle including: a power reception unit that receives power from an outside of the vehicle; a power storage device; a user input unit that receives setting of a schedule for timer charge; and a control device that controls the timer charge in which the power storage device is charged using the power supplied from the outside of the vehicle in accordance with the schedule that is set. The control device is configured to, when there is a vehicle system request before a charge start time defined by the schedule, keep charging and control based on the vehicle system request in a stand-by state until the charge start time defined by the schedule.

Consequently, it is possible to achieve the intention of the user, since priority can be given to the intention of the user to stand-by for timer charge over the vehicle system request.

In the vehicle according to the above aspect, the control device may be configured to start the charging and the control based on the vehicle system request at the charge start time and end the charging and the control based on the vehicle system request at a charge end time defined by the schedule.

Consequently, it is possible to execute control based on the vehicle system request in a charging period based on the schedule set with a timer based on the intention of the user.

The vehicle according to the above aspect may further include a heater configured to raise a temperature of the power storage device. The vehicle system request may be a request to raise the temperature of the power storage device or a request to cool the power storage device.

Consequently, it is possible to achieve the intention of the user, since priority can be given to the intention of the user to stand-by for timer charge over the battery temperature rise request.

With the present disclosure, it is possible to avoid a situation in which charge is performed or not performed against the intention of the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
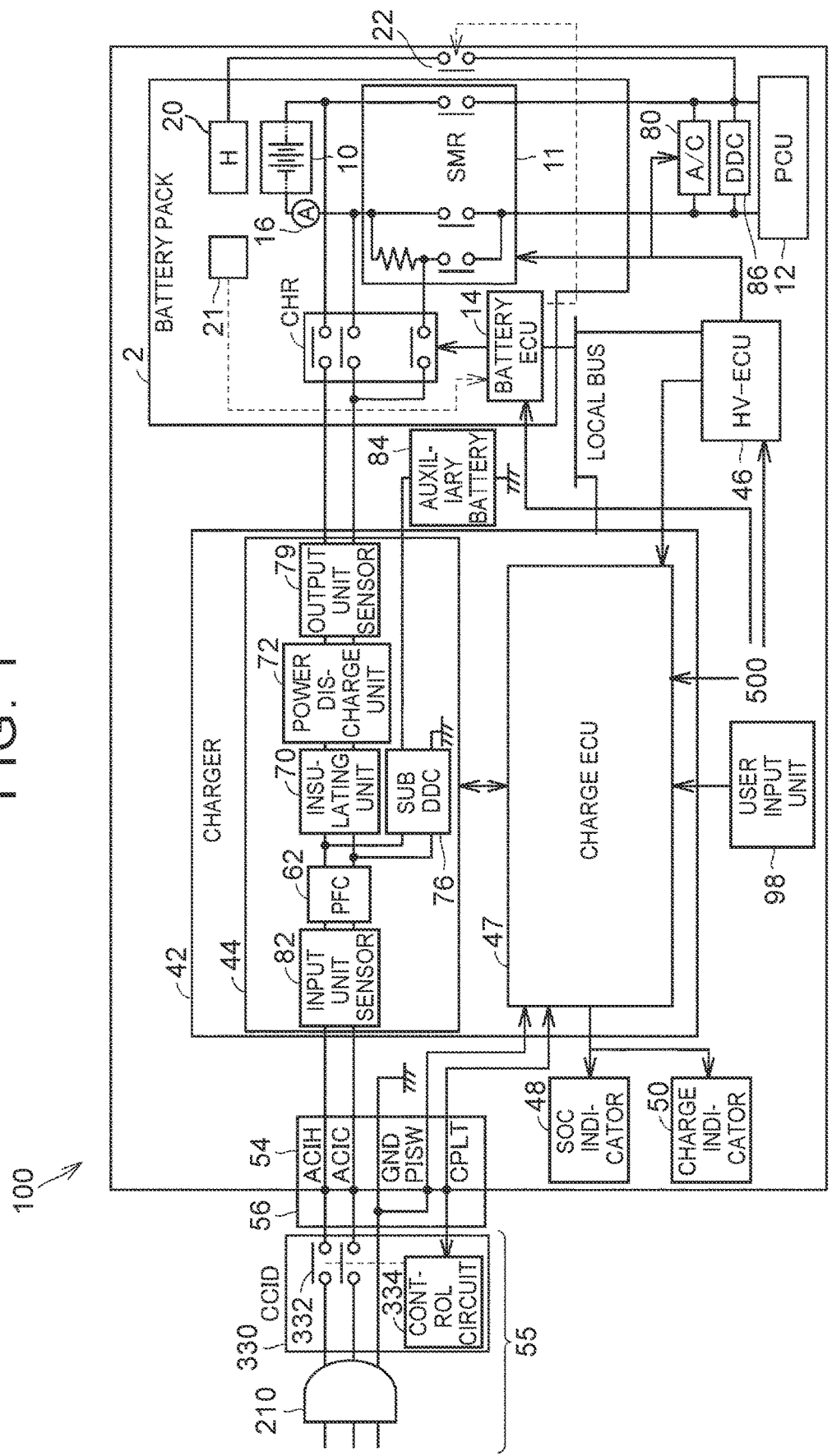
FIG. 1 is a block diagram of an entire hybrid electric vehicle illustrated as an example of a vehicle according to an embodiment.

An embodiment will be described below with reference to the drawings. FIG. 1 is a block diagram of the entire hybrid electric vehicle illustrated as an example of a vehicle according to the embodiment. Hereinafter, the "hybrid electric vehicle" will occasionally be referred to simply as a "vehicle". The present disclosure is applicable not only to hybrid electric vehicles, but also to electrified vehicles such as battery electric vehicles that can be charged from the outside.

With reference to FIG. 1, a hybrid electric vehicle 100 includes a user input unit 98, a battery pack 2, a power control unit (PCU) 12, a charger 42, a power reception unit 54, an auxiliary battery 84, an air conditioner 80, a direct-current (DC)/DC converter 86 (shown as DDC in the drawings), a hybrid vehicle (HV)-electronic control unit (ECU) 46, a state-of-charge (SOC) indicator 48, and a charge indicator 50.

The battery pack 2 includes a power storage device 10, a system main relay 11, a current sensor 16, a charge relay CHR, a battery ECU 14, a heater 20, a temperature sensor 21, and a heater switch 22.

The power storage device 10 is a rechargeable direct-current power source. Examples of the power storage device 10 include a nickel metal hydride battery, a lithium ion battery, a lead acid battery, a large-capacity capacitor, etc. The battery ECU 14 performs control so as to open and close the charge relay CHR, and calculates an SOC of the power storage device based on an output from the current sensor 16.

The PCU 12 is configured to include an inverter etc. that drives a motor (not illustrated) that drives the vehicle 100.

The air conditioner 80 can be driven to condition air in a vehicle cabin in advance before an occupant rides on the vehicle. For example, even when there is no occupant in the vehicle cabin, the air conditioner 80 can be operated in accordance with a time schedule set by the HV-ECU 46, a remote control operation, etc.

The power reception unit 54 is a charge inlet configured to be connectable to a connector 56 of a charge cable 55. The charge cable 55 is constituted from a plug 210 to be connected to a power source outside the vehicle, a chip card interface device (CCID) box 330 that includes a relay 332 and a control circuit 334, and the connector 56.

The DC/DC converter 86 is connected between a positive electrode line and a negative electrode line disposed between the system main relay 11 and the PCU 12. The DC/DC converter 86 supplies power to the auxiliary battery 84 for auxiliaries (such as headlights and audio devices) (not illustrated) and the heater 20.

An input end of the charger 42 is connected to the power reception unit 54. An output end of the charger 42 is connected to the power storage device 10 via the charge relay CHR.

When the connector 56 for charge (charging) is connected to the power reception unit 54, an operation mode is set to a charge mode. When the operation mode is set to the charge mode, the charger 42 receives power supplied from the power source outside the vehicle via a plug 210, the CCID box 330, and the connector 56. The charger 42 receives a control signal that includes a charge instruction from the HV-ECU 46. The charger 42 outputs a voltage suitable for charge to the power storage device 10.

Specifically, the charger 42 includes an input unit sensor 82, a power factor correction (PFC) 62, an insulating unit 70, a power discharge unit 72, an output unit sensor 79, a sub DC/DC conversion unit 76 (shown as sub DDC in the drawings), and a charge ECU 47.

When the operation mode is set to the charge mode, the PFC 62 converts alternating-current (AC) power from the power source outside the vehicle into high-frequency AC power with an improved power factor. The insulating unit 70 is constituted of an insulating transformer etc., and boosts an AC voltage. The power discharge unit 72 operates as a rectifier circuit that rectifies an output from the insulating unit 70. The DC voltage output from the power discharge unit 72 has been controlled to a voltage suitable to charge the power storage device 10. The output unit sensor 79 measures an output voltage VH from the power discharge unit 72.

As illustrated in FIG. 1, when the connector 56 of the charge cable 55 is connected to the power reception unit 54 of the hybrid electric vehicle 100, for example, the charge ECU 47 communicates a control pilot signal CPLT with the control circuit 334 of the CCID box 330 of the charge cable 55. When a connection is detected, the charge ECU 47 requests the CCID box 330 to supply power by closing the relay 332 inside the CCID box 330 using the control pilot signal CPLT.

The charge ECU 47, the HV-ECU 46, and the battery ECU 14 constitute the control device 500.

The user input unit 98 receives setting of a schedule for timer charge. The temperature sensor 21 detects the temperature of the power storage device 10. DC power at a voltage reduced by the DC/DC converter 86 is supplied to the heater 20 via the heater switch 22.

The battery ECU 14 sends a battery temperature rise request to the charge ECU 47 upon detecting that the temperature of the power storage device 10 is equal to or less than a predetermined temperature. When a permission to raise the battery temperature is provided from the charge ECU 47, the battery ECU 14 raises the temperature of the power storage device 10 by actuating the heater 20 using power from the power storage device 10 by turning on the heater switch 22.

In the present embodiment, when there is overlap in charge period between a plurality of charge schedules, each of which defines a charge start time and a charge end time, the control device 500 controls charge so as to match the intention of the user.

The control device 500 controls timer charge in which the power storage device 10 is charged using power supplied from the outside of the vehicle in accordance with a set schedule (a schedule that is set).

In the case where there is overlap between a charge time band of a first schedule that defines a charge start time (first charge start time) and a charge end time (first charge end time) and a charge time band of a second schedule that defines a charge start time (second charge start time) and a charge end time (second charge end time), the control device 500 starts charge (charging) at the earlier one of the charge start time of the first schedule and the charge start time of the second schedule when such charge start times are different from each other, and ends charge at the later one of the charge end time of the first schedule and the charge end time of the second schedule when such charge end times are different from each other. The control device 500 starts charge at a first time when the charge start time of the first schedule and the charge start time of the second schedule are the same as each other and are the first time, and ends charge at a second time when the charge end time of the first schedule and the charge end time of the second schedule are the same as each other and are the second time.

Figure 2A:
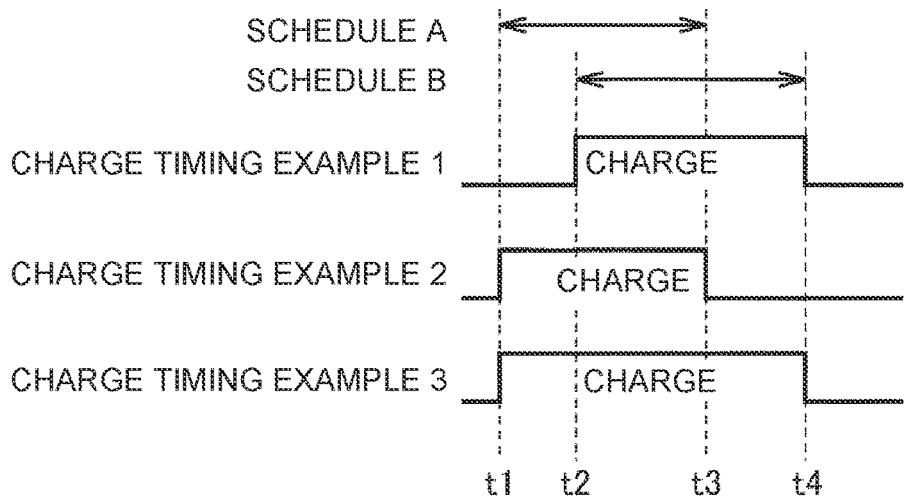
FIG. 2A illustrates an example of coordination of charge schedules according to a first embodiment.
Figure 2B:
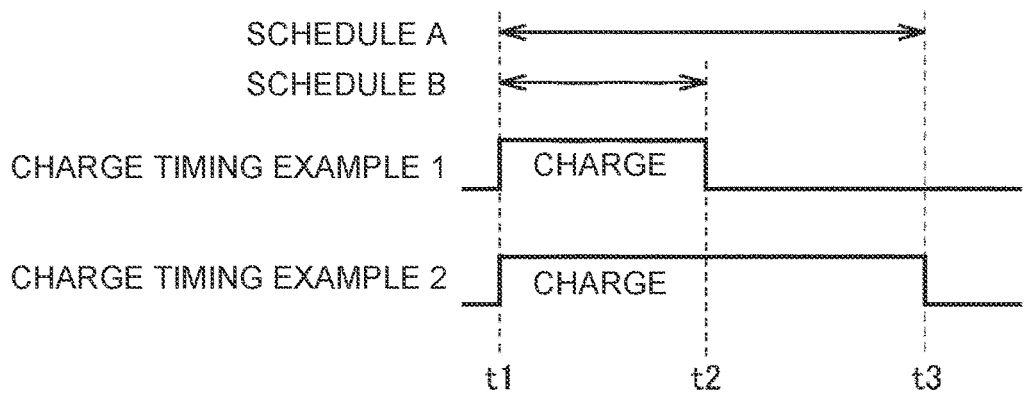
FIG. 2B illustrates another example of coordination of charge schedules according to a first embodiment.
Figure 2C:
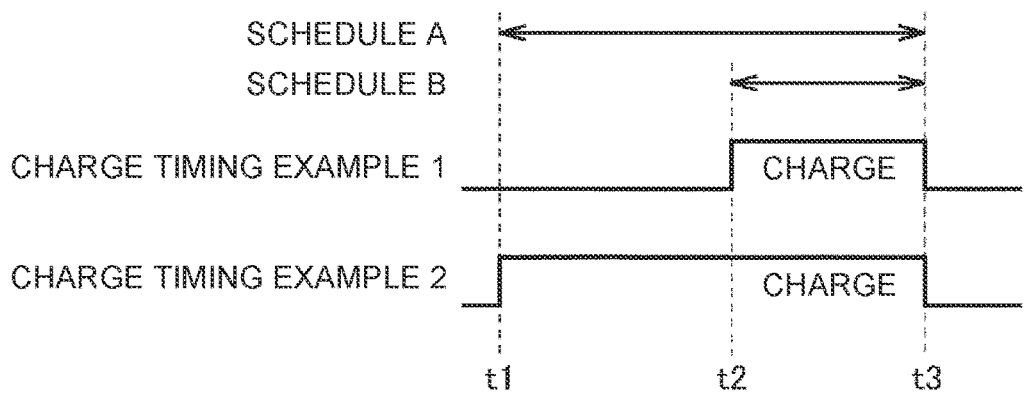
FIG. 2C illustrates still another example of coordination of charge schedules according to a first embodiment.

FIGS. 2A, 2B, and 2C each illustrate an example of coordination of charge schedules according to a first embodiment. A charge schedule A that defines a charge start time and a charge end time is a schedule that is not set with an intention to fully charge the power storage device 10, but that is set with an intention to perform charge in a time band at a low electricity rate such as nighttime.

In FIG. 2A, the charge start time and the charge end time of the charge schedule A are t1 and t3, respectively. The charge start time and the charge end time of a charge schedule B are t2 and t4, respectively.

In Example 1 (inappropriate example), the charge ECU 47 starts charge at the charge start time t2 that is the later one of the charge start times t1 and t2. The charge ECU 47 ends charge at the charge end time t4 that is the later one of the charge end times t3 and t4. Starting charge at the charge start time t2 that is the later is against the intention of the user. This is because the user desires to perform charge at a rate that is as low as possible and, thus, starting charge at a late charge start time shortens the time of charge at a low rate.

In Example 2 (inappropriate example), the charge ECU 47 starts charge at the charge start time t1 that is the earlier one of the charge start times t1 and t2. The charge ECU 47 ends charge at the charge end time t3 that is the earlier one of the charge end times t3 and t4. Ending charge at the charge end time t3 that is the earlier is against the intention of the user. This is because the user desires to perform charge at a rate that is as low as possible and, thus, ending charge at an early charge end time shortens the time of charge at a low rate.

In Example 3 (example according to the first embodiment), the charge ECU 47 starts charge at the charge start time t1 that is the earlier one of the charge start times t1 and t2. The charge ECU 47 ends charge at the charge end time t4 that is the later one of the charge end times t3 and t4. This example secures a long charge time at a low rate and allows a plurality of charge schedules to be connected seamlessly, and thus can achieve the intention of the user.

In FIG. 2B, the charge start time and the charge end time of a charge schedule A are t1 and t3, respectively. The charge start time and the charge end time of a charge schedule B are t1 and t2, respectively.

In Example 1 (inappropriate example), the charge ECU 47 starts charge at the same charge start time t1. The charge ECU 47 ends charge at the charge end time t2 that is the earlier one of the charge end times t2 and t3. Ending charge at the charge end time t2 that is the earlier is against the intention of the user. This is because the user desires to perform charge at a rate that is as low as possible and, thus, ending charge at an early charge end time shortens the time of charge at a low rate.

In Example 2 (example according to the first embodiment), the charge ECU 47 starts charge at the same charge start time t1. The charge ECU 47 ends charge at the charge end time t3 that is the later one of the charge end times t2 and t3. This example secures a long charge time at a low rate and allows a plurality of charge schedules to be connected seamlessly without contradicting the intention of the user.

In FIG. 2C, the charge start time and the charge end time of a charge schedule A are t1 and t3, respectively. The charge start time and the charge end time of a charge schedule B are t2 and t3, respectively.

In Example 1 (inappropriate example), the charge ECU 47 starts charge at the charge start time t2 that is the later one of the charge start times t1 and t2. The charge ECU 47 ends charge at the same charge end time t3. Starting charge at the charge start time t2 that is the later is against the intention of the user. This is because the user desires to perform charge at a rate that is as low as possible and, thus, starting charge at a late charge start time shortens the time of charge at a low rate.

In Example 2 (example according to the first embodiment), the charge ECU 47 starts charge at the charge start time t1 that is the earlier one of the charge start times t1 and t2. The charge ECU 47 ends charge at the same charge end time t3. This example secures a long charge time at a low rate and allows a plurality of charge schedules to be connected seamlessly without contradicting the intention of the user.

Figure 3:
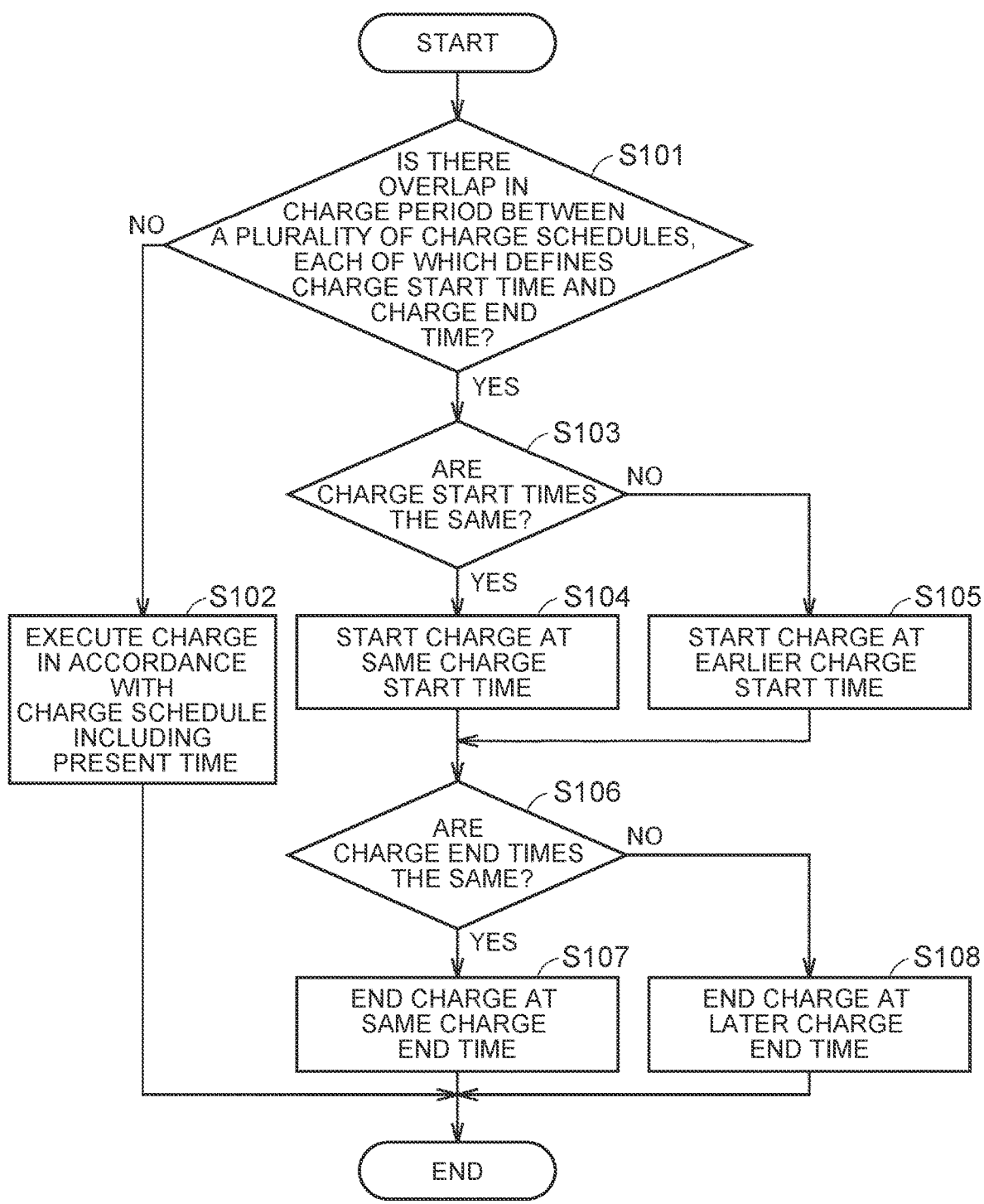
FIG. 3 is a flowchart illustrating charge timing control according to the first embodiment.

FIG. 3 is a flowchart illustrating charge timing control according to the first embodiment.

When there is overlap in charge period between a plurality of charge schedules, each of which defines a charge start time and a charge end time in S101, the process proceeds to S103. When there is no such overlap in S101, the process proceeds to S102.

In S102, the charge ECU 47 executes charge in accordance with a charge schedule including the present time (in other words, a charge schedule which the present time falls within).

When the charge start times of the charge schedules are the same as each other in S103, the process proceeds to S104. When the charge start times of the charge schedules are different from each other in S103, the process proceeds to S105.

In S104, the charge ECU 47 starts charge at the same charge start time.

In S105, the charge ECU 47 starts charge at the earlier one of the charge start times.

When the charge end times of the charge schedules are the same as each other in S106, the process proceeds to S107. When the charge end times of the charge schedules are different from each other in S106, the process proceeds to S108.

In S107, the charge ECU 47 ends charge at the same charge end time.

In S108, the charge ECU 47 ends charge at the later one of the charge end times.

Second Embodiment

In the present embodiment, when there is overlap in charge period between a charge schedule that defines a charge start time and a charge end time and a charge schedule that defines only a charge start time, the control device 500 controls charge so as to match the intention of the user.

In the case where there is overlap between a charge time band of a first schedule that defines only a charge start time (first charge start time) and a charge time band of a second schedule that defines a charge start time (second charge start time) and a charge end time (second charge end time), the control device 500 starts charge at the charge start time of the first schedule and executes charge until power storage device is fully charged when the charge start time of the first schedule is earlier than the charge start time of the second schedule, and starts charge at the charge start time of the second schedule and ends charge at the charge end time of the second schedule when the charge start time of the second schedule is earlier than the charge start time of the first schedule.

In the case where there is overlap between a charge time band of the first schedule that defines only a charge start time and a charge time band of the second schedule that defines a charge start time and a charge end time, the control device 500 starts charge at a first time and ends charge at the charge end time of the second schedule when the charge start time of the first schedule and the charge start time of the second schedule are the same as each other and are the first time.

Figure 4A:
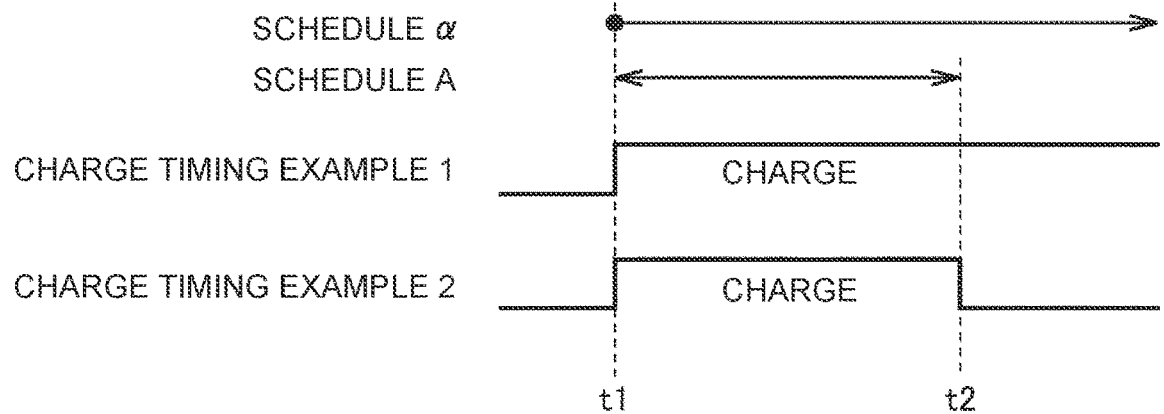
FIG. 4A illustrates an example of coordination of charge schedules according to a second embodiment.
Figure 4B:
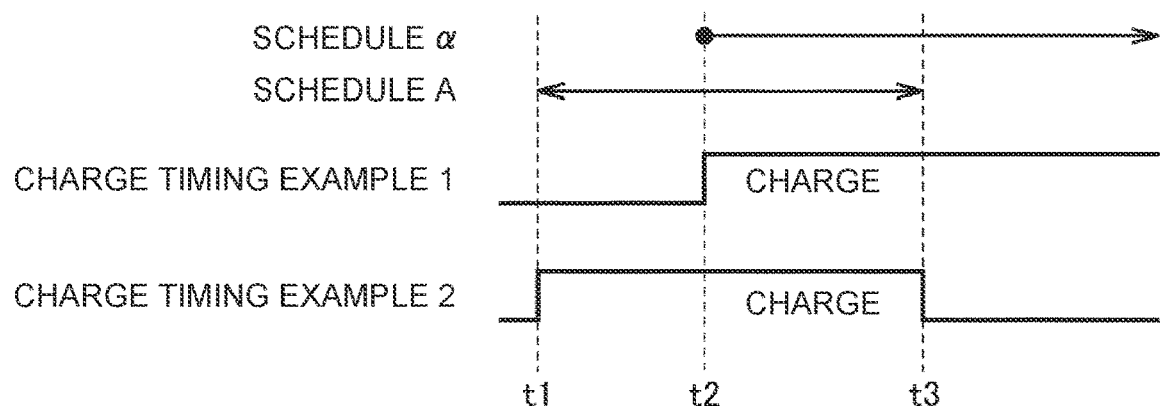
FIG. 4B illustrates another example of coordination of charge schedules according to a second embodiment.
Figure 4C:
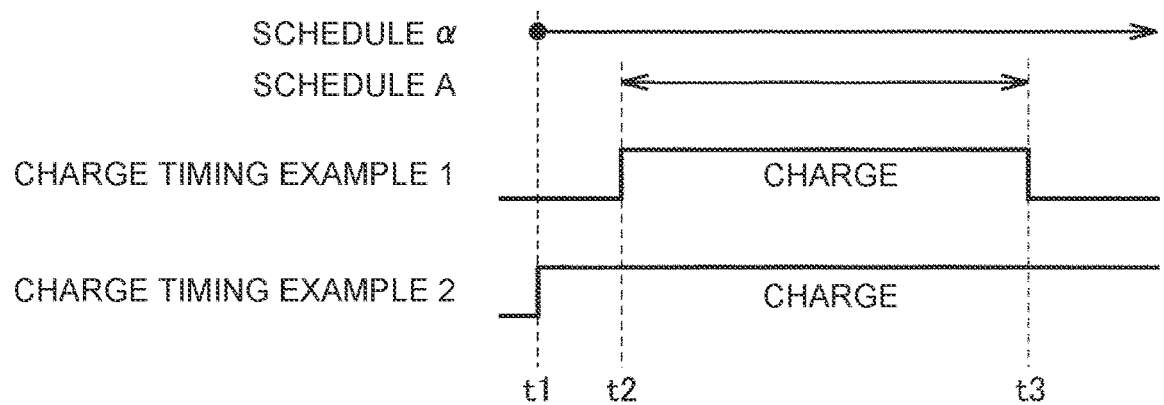
FIG. 4C illustrates still another example of coordination of charge schedules according to a second embodiment.

FIGS. 4A, 4B, and 4C each illustrate an example of coordination of charge schedules according to a second embodiment. A charge schedule A is not intended to fully charge the power storage device 10, but is intended to perform charge in a time band at a low electricity rate such as nighttime. A charge schedule α is intended to fully charge the power storage device 10.

In FIG. 4A, the charge start time of the charge schedule α is t1. The charge start time and the charge end time of the charge schedule A are t1 and t2, respectively.

In Example 1 (inappropriate example), the charge ECU 47 starts charge at the same charge start time t1. The charge ECU 47 ends charge after the power storage device 10 is fully charged in accordance with the charge schedule α. This example is against the intention of the user. This is because the user's purpose of performing charge at a low rate such that the charge end time is not delayed is not achieved.

In Example 2 (example according to the second embodiment), the charge ECU 47 starts charge at the same charge start time t1. The charge ECU 47 ends charge at the charge end time t2 in accordance with the charge schedule A. This example matches the intention of the user. This is because the user's purpose of performing charge at a low rate such that the charge end time is not delayed is achieved. That is, continuing charge beyond the charge end time t2 may involve charge at a high rate, and such charge can be avoided.

In FIG. 4B, the charge start time of the charge schedule α is t2. The charge start time and the charge end time of the charge schedule A are t1 and t3, respectively.

In Example 1 (inappropriate example), the charge ECU 47 starts charge at the charge start time t2 that is the later one of the charge start times t1 and t2. Since the charge start time t2 of the charge schedule α is selected, the charge end time is also determined in accordance with the charge schedule α, and the charge ECU 47 ends charge after the power storage device 10 is fully charged. This example is against the intention of the user. This is because the user's purpose of performing charge at a low rate such that charge starts early is not achieved.

In Example 2 (example according to the second embodiment), the charge ECU 47 starts charge at the charge start time t1 that is the earlier one of the charge start times t1 and t2. Since the charge start time t1 of the charge schedule A is selected, the charge end time is also determined in accordance with the charge schedule A, and the charge ECU 47 ends charge at the charge end time t3. This example matches the intention of the user. This is because the user's purpose of starting charge early and performing charge at a low rate is achieved.

In FIG. 4C, the charge start time of the charge schedule α is t1. The charge start time and the charge end time of the charge schedule A are t2 and t3, respectively.

In Example 1 (inappropriate example), the charge ECU 47 starts charge at the charge start time t2 that is the later one of the charge start times t1 and t2. Since the charge start time t2 of the charge schedule A is selected, the charge end time is also determined in accordance with the charge schedule A, and the charge ECU 47 ends charge at the charge end time t3. This example is against the intention of the user. This is because the user's purpose of starting charge early to fully charge is not achieved.

In Example 2 (example according to the second embodiment), the charge ECU 47 starts charge at the charge start time t1 that is the earlier one of the charge start times t1 and t2. Since the charge start time t1 of the charge schedule α is selected, the charge end time is also determined in accordance with the charge schedule α, and the charge ECU 47 ends charge after the power storage device 10 is fully charged. This example matches the intention of the user. This is because the user's purpose of starting charge early to fully charge the power storage device 10 is achieved.

Figure 5:
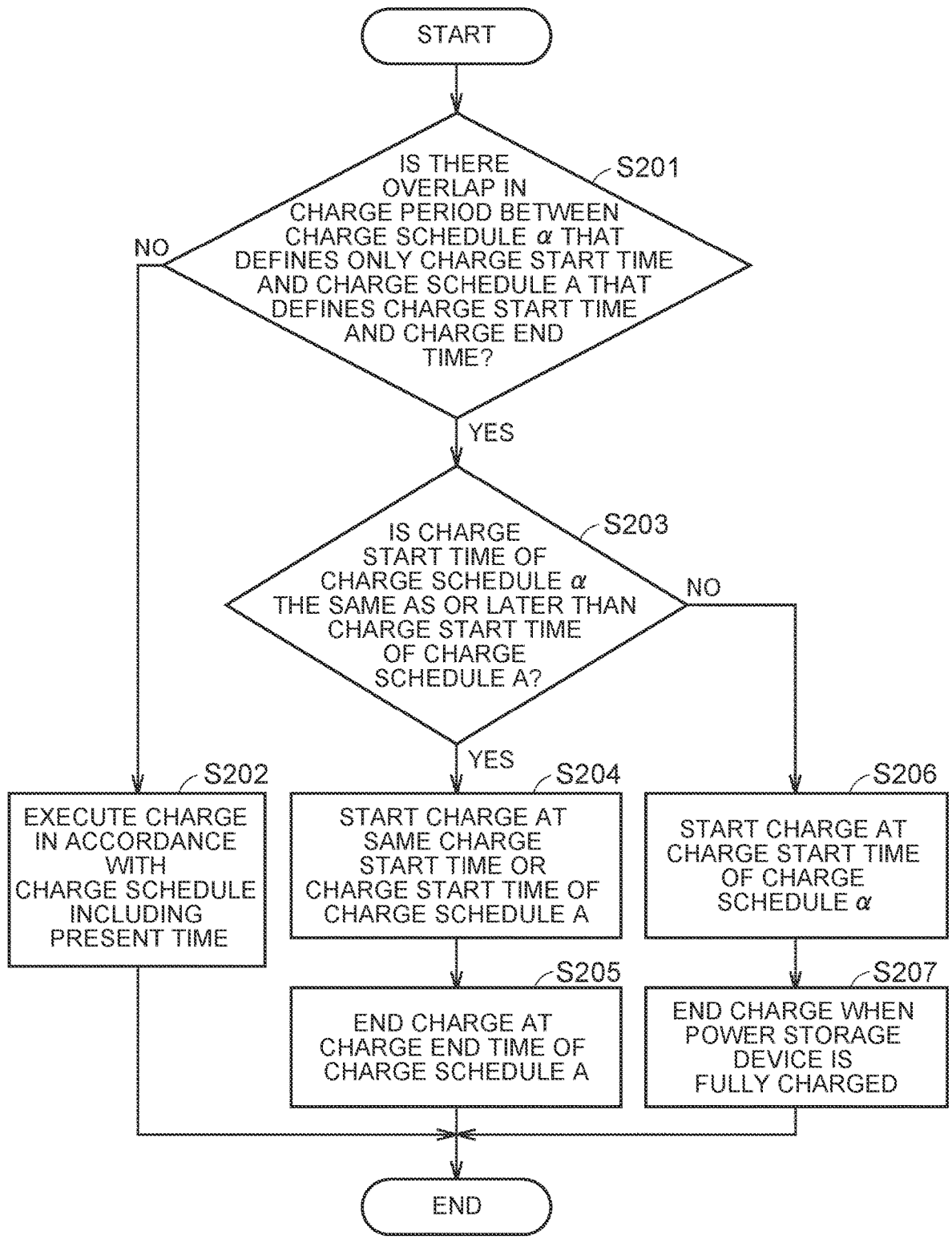
FIG. 5 is a flowchart illustrating charge timing control according to the second embodiment.

FIG. 5 is a flowchart illustrating charge timing control according to the second embodiment.

When there is overlap in charge period between the charge schedule α that defines only a charge start time and the charge schedule A that defines a charge start time and a charge end time in S201, the process proceeds to S203. When there is no such overlap in S201, the process proceeds to S202.

In S202, the charge ECU 47 executes charge in accordance with a charge schedule including the present time.

When the charge start time of the charge schedule α is the same as or later than the charge start time of the charge schedule A in S203, the process proceeds to S204. When the charge start time of the charge schedule α is earlier than the charge start time of the charge schedule A in S203, the process proceeds to S206.

In S204, the charge ECU 47 starts charge at the same charge start time or at the charge start time of the charge schedule A that is the earlier.

In S205, the charge ECU 47 ends charge at the charge end time of the charge schedule A.

In S206, the charge ECU 47 starts charge at the charge start time of the charge schedule α that is the earlier.

In S207, the charge ECU 47 ends charge after the power storage device 10 is fully charged.

Third Embodiment

In the present embodiment, the control device 500 controls charge so as to match the intention of the user when there is overlap between a charge period defined by a charge schedule and a period of a my room mode request from the user.

The "my room mode" is a mode of a vehicle that enables plug-in charge in which the vehicle cabin can be used as if the vehicle cabin were one's own room by allowing operation of in-vehicle electric load devices (such as the air conditioner 80 and an audio device (not illustrated)) while prohibiting travel of the vehicle. In the my room mode, the electric load devices are driven using power from the power storage device 10. The my room mode request may include not only a request for operation of the electric load devices from the inside of the vehicle, but also a request for operation of the electric load devices from the outside of the vehicle.

When there is a my room mode request that requests use of electric load devices before a charge start time defined by a schedule (i.e. during timer stand-by), the control device 500 starts charge and allows operation of the electric load devices in accordance with the my room mode request. After the my room mode request is ended, the control device 500 controls charge and operation of the electric load device in accordance with the schedule.

Figure 6A:
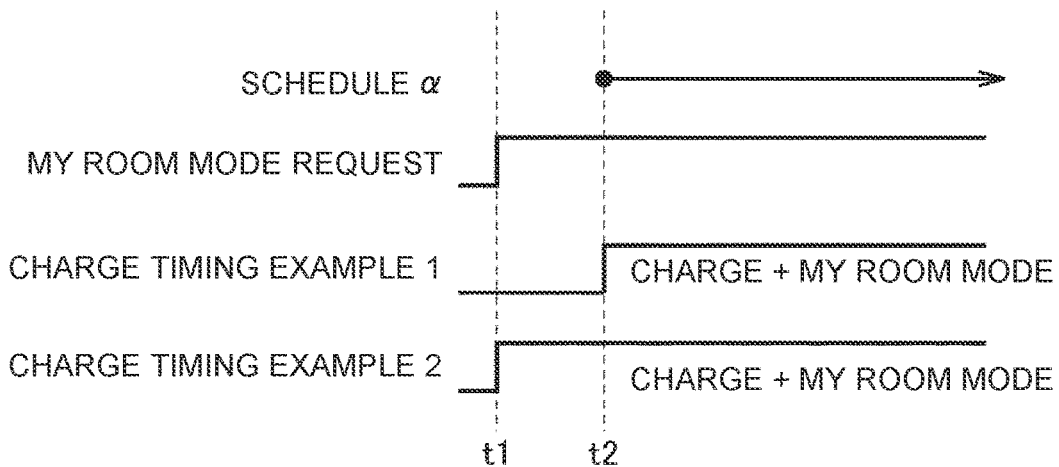
FIG. 6A illustrates an example of coordination of charge schedules according to a third embodiment.
Figure 6B:
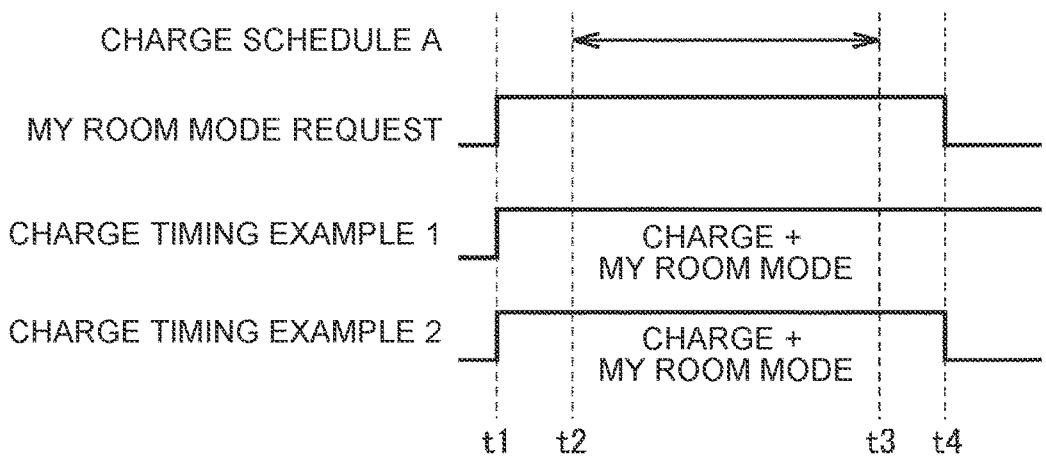
FIG. 6B illustrates another example of coordination of charge schedules according to a third embodiment.
Figure 6C:
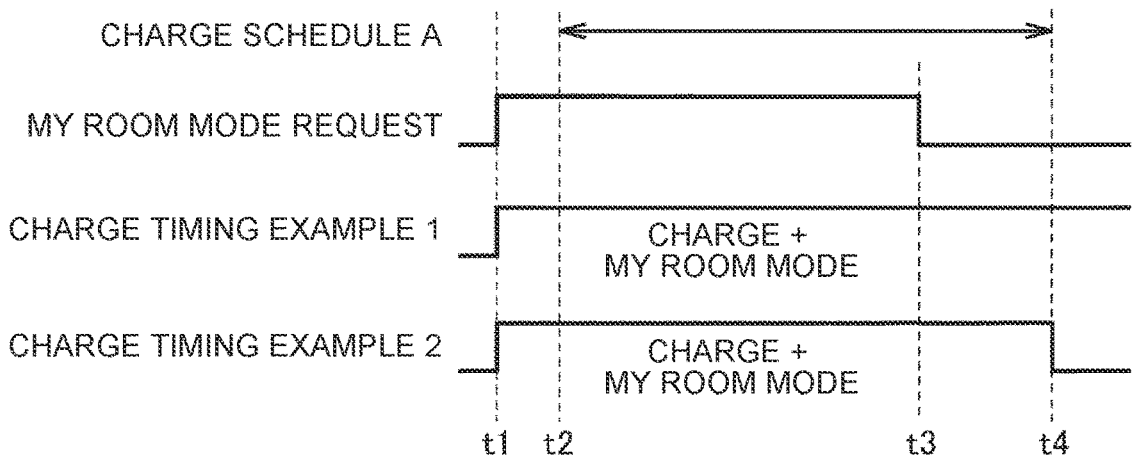
FIG. 6C illustrates still another example of coordination of charge schedules according to a third embodiment.

FIGS. 6A, 6B, and 6C each illustrate an example of coordination of charge schedules according to a third embodiment.

In FIG. 6A, the charge start time of a charge schedule α is t2. The start time of a my room mode request is t1.

In Example 1 (inappropriate example), the charge ECU 47 starts charge at the charge start time t2 of the charge schedule α. In this example, the user cannot use the in-vehicle electric load device immediately after the my room mode request, which is against the intention of the user.

In Example 2 (example according to the third embodiment), the charge ECU 47 permits use of the electric load device in accordance with the my room mode request and starts charge at the start time t1 of the my room mode request. In this example, the user can use the electric load device immediately after the my room mode request, which matches the intention of the user.

In FIG. 6B, the charge start time and the charge end time of a charge schedule A are t2 and t3, respectively. The start time and the end time of a my room mode request are t1 and t4, respectively.

In Example 1 (inappropriate example), the charge ECU 47 permits use of the electric load device in accordance with the my room mode request and starts charge at the start time t1 of the my room mode request. The charge ECU 47 ends charge after the power storage device 10 is fully charged. In this example, charge is continued even when the my room mode request is ended and the charge end time t3 of the charge schedule A is passed, which is against the intention of the user.

In Example 2 (example according to the third embodiment), the charge ECU 47 permits use of the electric load device in accordance with the my room mode request and starts charge at the start time t1 of the my room mode request. The charge ECU 47 ends charge in accordance with the schedule of the charge schedule A at the end time t4 of the my room mode request. In this example, the my room mode request is given priority, and the charge schedule A is also taken into consideration, which matches the intention of the user. This is because when the my room mode request is ended the charge end time t3 of the charge schedule A is passed, so charge is ended.

In FIG. 6C, the charge start time and the charge end time of a charge schedule A are t2 and t4, respectively. The start time and the end time of a my room mode request are t1 and t3, respectively.

In Example 1 (inappropriate example), the charge ECU 47 permits use of the electric load device in accordance with the my room mode request and starts charge at the start time t1 of the my room mode request. The charge ECU 47 ends charge after the power storage device 10 is fully charged. In this example, charge is continued even when the my room mode request is ended and the charge end time t4 of the charge schedule A is passed, which is against the intention of the user.

In Example 2 (example according to the third embodiment), the charge ECU 47 permits use of the electric load device in accordance with the my room mode request and starts charge at the start time t1 of the my room mode request. The charge ECU 47 ends charge at the charge end time t4 of the charge schedule A. In this example, the my room mode request is given priority, and the charge schedule A is also taken into consideration, which matches the intention of the user. This is because the my room mode request is ended during the charge period of the charge schedule A and, thus, charge is ended at the charge end time t4 of the charge schedule A.

Figure 7:
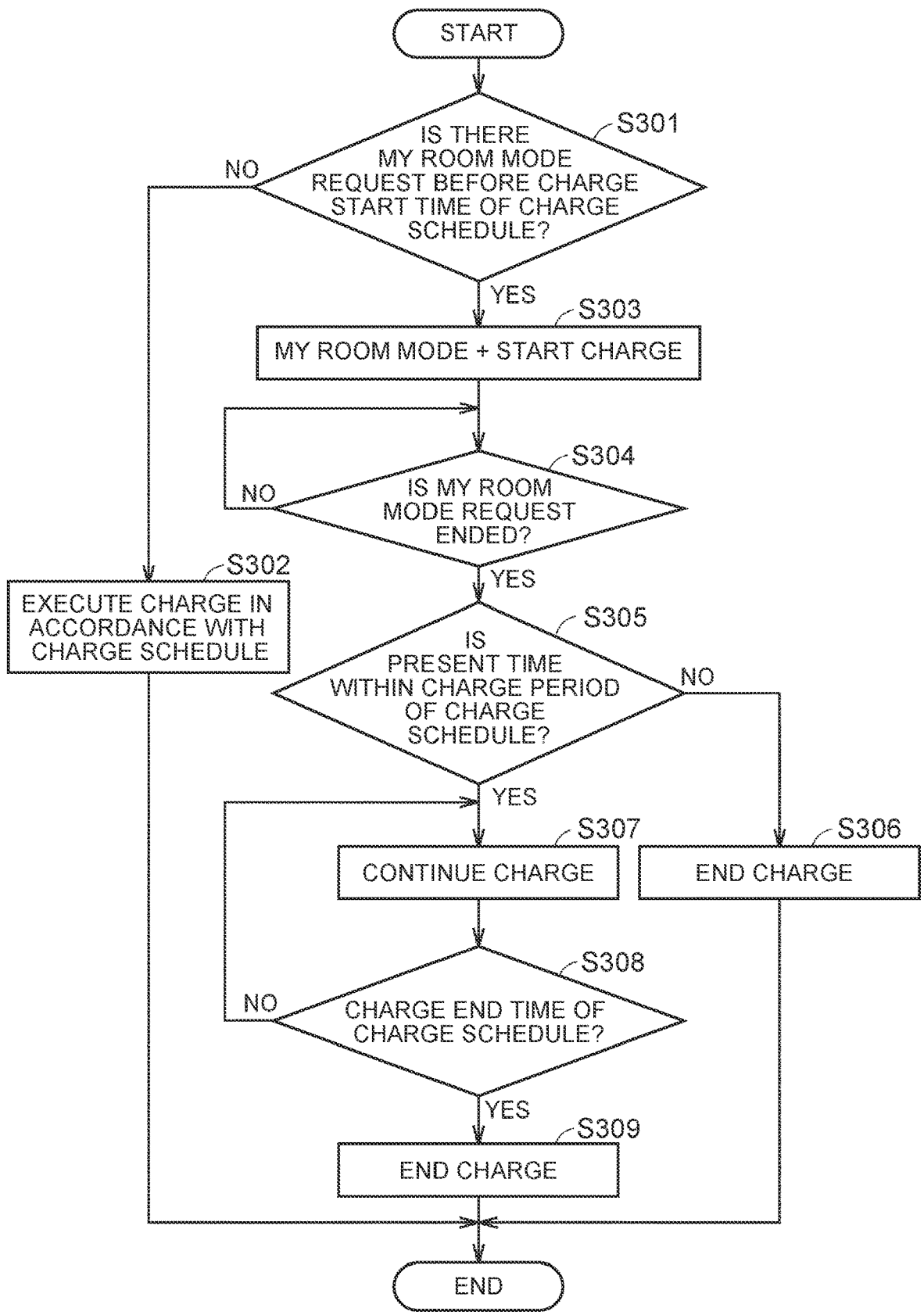
FIG. 7 is a flowchart illustrating charge timing control according to the third embodiment.

FIG. 7 is a flowchart illustrating charge timing control according to the third embodiment.

When the start of a my room mode request is provided before the charge start time of a charge schedule in S301, the process proceeds to S303. When the start of the my room mode request is not provided before the charge start time of the charge schedule, the process proceeds to S302.

In S302, the charge ECU 47 executes charge in accordance with the charge schedule including the present time.

In S303, the charge ECU 47 immediately permits use of the electric load devices in accordance with the my room mode request and starts charge.

When the my room mode request is ended in S304, the process proceeds to S305.

When the present time at which the my room mode request is ended is within the charge period defined by the charge schedule in S305, the process proceeds to S307. When the present time is not within the charge period defined by the charge schedule in S305, the process proceeds to S306.

In S306, the charge ECU 47 immediately ends charge.
In S307, the charge ECU 47 continues charge.

When the present time corresponds to the charge end time of the charge schedule in S308, the process proceeds to S309.

In S309, the charge ECU 47 immediately ends charge.

Fourth Embodiment

In the present embodiment, the control device 500 controls charge so as to match the intention of the user when there is overlap between a charge period defined by a charge schedule and a period of a vehicle system request for a battery temperature rise etc. The vehicle system request is a request for control of the vehicle to be executed using power from the power storage device 10, such as a battery temperature rise request and a battery cooling request.

When a vehicle system request is provided before a charge start time defined by a schedule, the control device 500 put charge and control based on the vehicle system request in a stand-by state (suspends charge and control based on the vehicle system request) until the charge start time defined by the schedule. The control device 500 starts charge and control based on the vehicle system request at the charge start time defined by the schedule, and ends charge and control based on the vehicle system request at a charge end time defined by the schedule.

Figure 8:
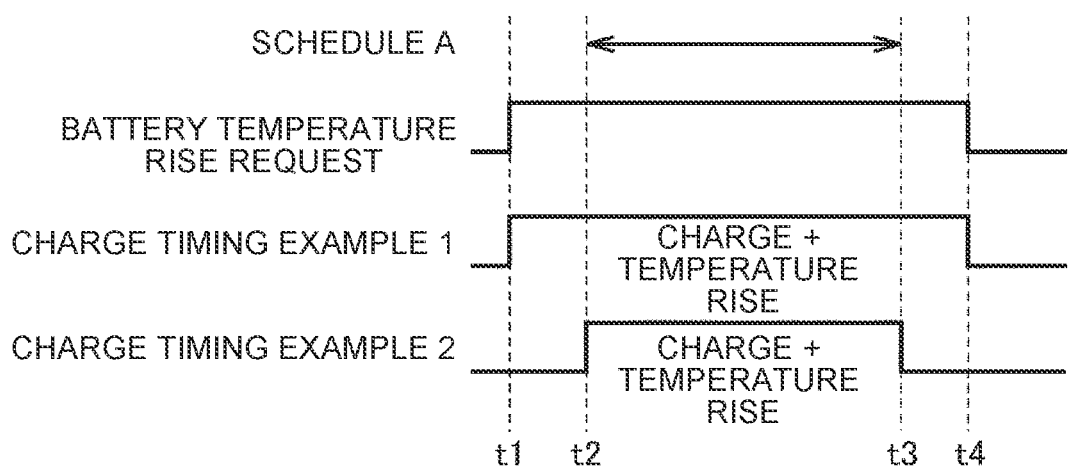
FIG. 8 illustrates an example of coordination of a charge schedule according to a fourth embodiment.

FIG. 8 illustrates an example of coordination of a charge schedule according to a fourth embodiment.

In FIG. 8, the charge start time and the charge end time of a charge schedule A are t2 and t3, respectively. The start time and the end time of a battery temperature rise request are t1 and t4, respectively.

In Example 1 (inappropriate example), the charge ECU 47 starts charge and battery temperature rise at the start time t1 of the battery temperature rise request. The charge ECU 47 ends charge and battery temperature rise at the end time t4 of the battery temperature rise request. In this example, the intention of the user to stand-by for timer charge is ignored, which is against the intention of the user.

In Example 2 (example according to the fourth embodiment), the charge ECU 47 starts charge and battery temperature rise at the charge start time t2 of the charge schedule A. The charge ECU 47 ends charge and battery temperature rise at the charge end time t3 of the charge schedule A. In this example, the intention of the user to stand-by for timer charge is reflected, which matches the intention of the user.

Figure 9:
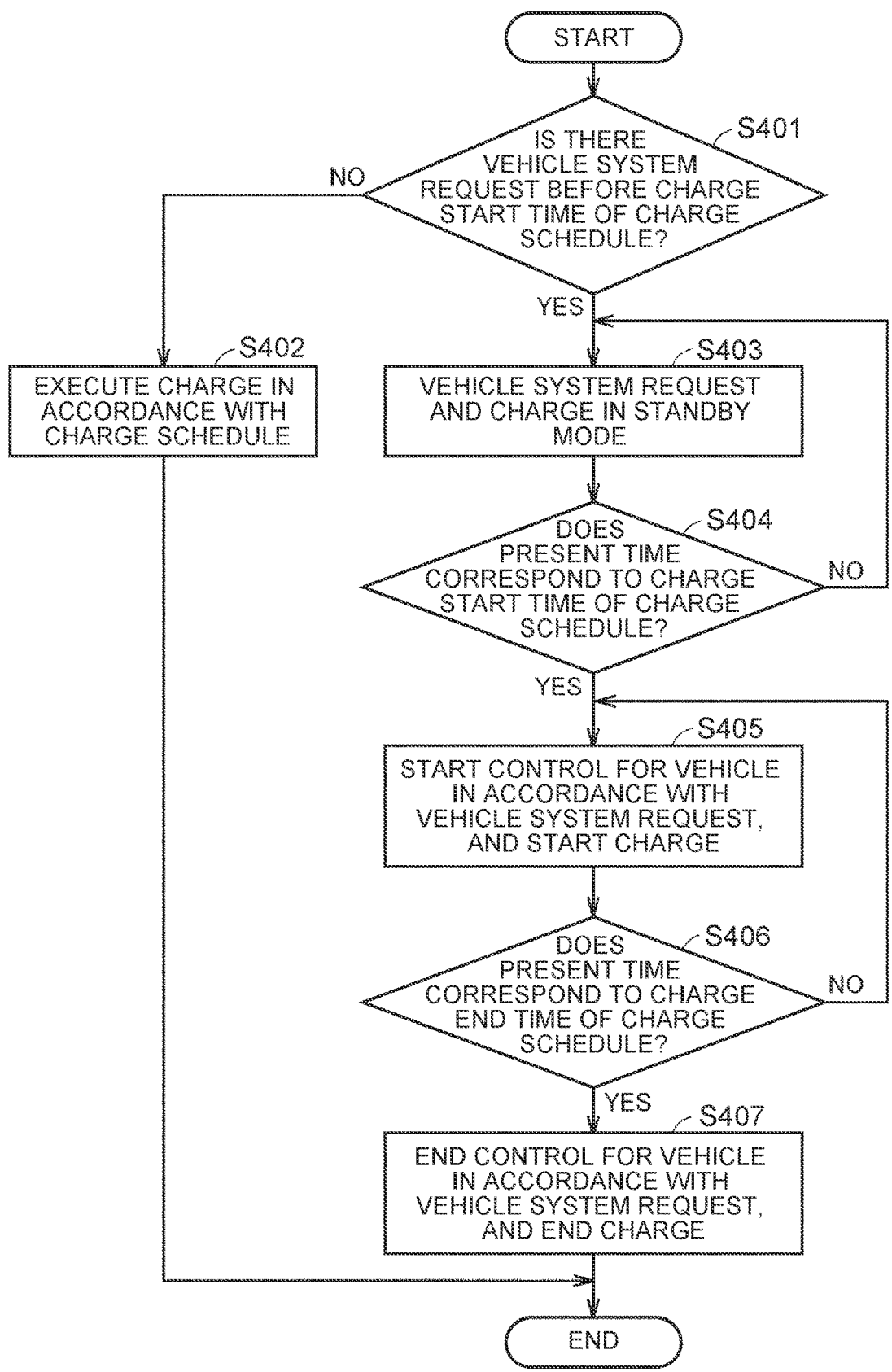
FIG. 9 is a flowchart illustrating charge timing control according to the fourth embodiment.

FIG. 9 is a flowchart illustrating charge timing control according to the fourth embodiment.

When the start of a vehicle system request (such as a battery temperature rise request) is provided before the charge start time of a charge schedule in S401, the process proceeds to S403. When the start of the vehicle system request is not provided before the charge start time of the charge schedule, the process proceeds to S402.

In S402, the charge ECU 47 executes charge in accordance with the charge schedule including the present time.

In S403, the charge ECU 47 put the vehicle system request and charge in a stand-by state.

When the present time corresponds to the charge start time of the charge schedule in S404, the process proceeds to S405.

In S405, the charge ECU 47 immediately starts control for the vehicle in accordance with the vehicle system request, and starts charge.

When the present time corresponds to the charge end time of the charge schedule in S406, the process proceeds to S407.

In S407, the charge ECU 47 immediately ends control for the vehicle in accordance with the vehicle system request, and ends charge.

Fifth Embodiment

The present embodiment is a combination of the first to fourth embodiments.

First, the control device 500 coordinates a plurality of timer setting schedules in accordance with the first and second embodiments.

When there is a my room mode request during timer stand-by, the control device 500 executes operation of the electric load devices and charge for the operation of the electric load devices in accordance with the my room mode request. When there is a vehicle system request during timer stand-by, the control device 500 put the vehicle system request and charge in a stand-by state (suspends the vehicle system request and charge). When there is a vehicle system request during charge, the control device 500 controls the vehicle in accordance with the vehicle system request.

Figure 10:
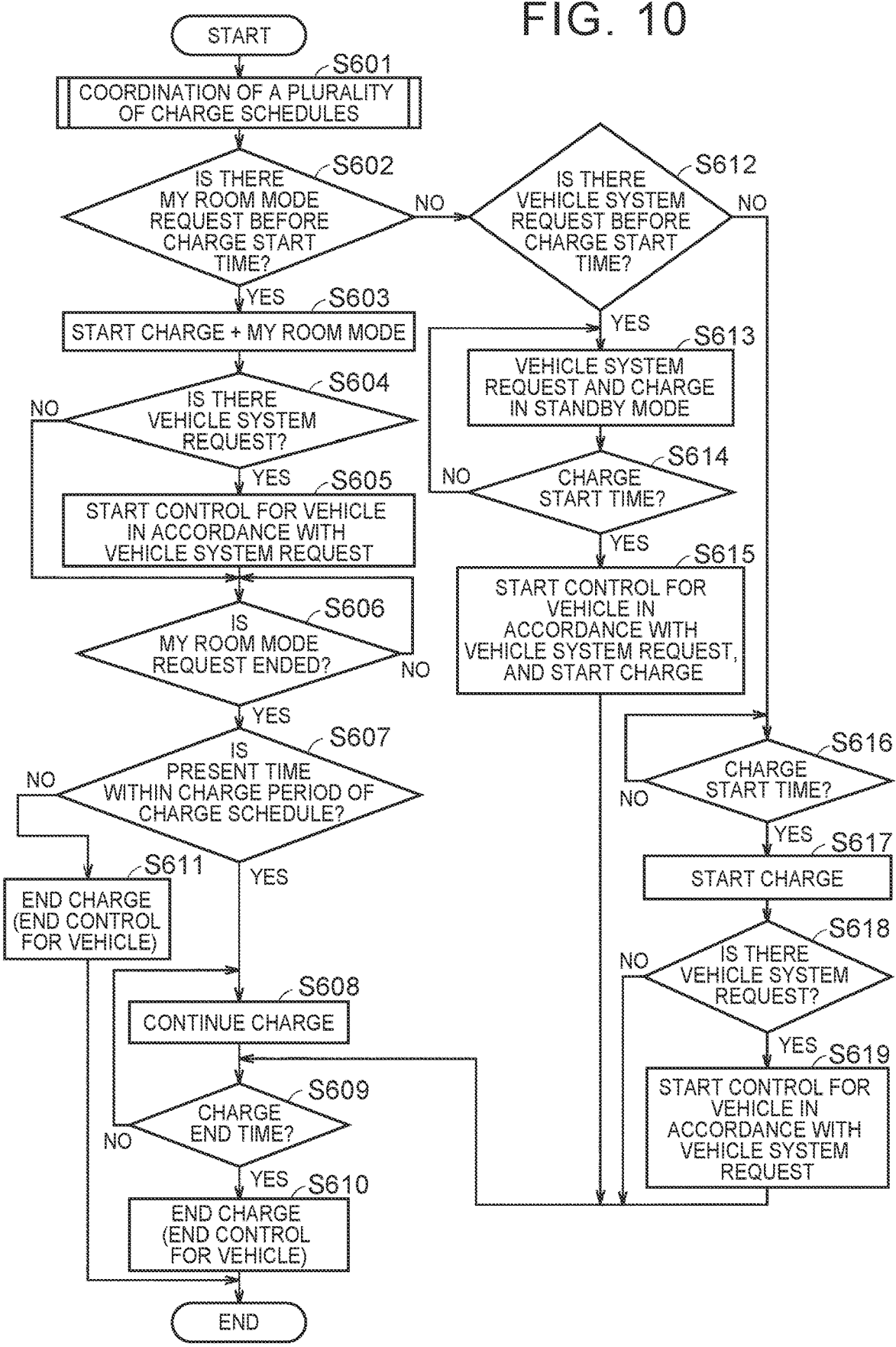
FIG. 10 is a flowchart illustrating charge timing control according to a fifth embodiment.

FIG. 10 is a flowchart illustrating charge timing control according to a fifth embodiment.

In S601, the charge ECU 47 coordinates a plurality of charge schedules.

When the start of a my room mode request is provided before the charge start time of a charge schedule in S602, the process proceeds to S603. When the start of the my room mode request is not provided before the charge start time of the charge schedule, the process proceeds to S612.

In S603, the charge ECU 47 immediately starts charge and operation of the electric load devices in accordance with the my room mode request.

When the start of a vehicle system request is provided in S604, the process proceeds to S605. When the start of the vehicle system request is not provided in S604, the process proceeds to S606.

In S605, the charge ECU 47 immediately starts control for the vehicle in accordance with the vehicle system request.

When the my room mode request is ended in S606, the process proceeds to S607.

When the present time is within a charge period defined by the charge schedule in S607, the process proceeds to S608. When the present time is not within the charge period defined by the charge schedule in S607, the process proceeds to S611.

In S611, the charge ECU 47 immediately ends charge.
In S608, the charge ECU 47 continues charge.

When the present time corresponds to the charge end time of the charge schedule in S609, the process proceeds to S610.

In S610, the charge ECU 47 immediately ends charge. When the start of the vehicle system request is provided before the charge start time of the charge schedule in S612, the process proceeds to S613. When the start of the vehicle system request is not provided before the charge start time of the charge schedule, the process proceeds to S616.

In S613, the charge ECU 47 put the vehicle system request and charge in a stand-by state.

When the present time corresponds to the charge start time of the charge schedule in S614, the process proceeds to S615.

In S615, the charge ECU 47 immediately starts control for the vehicle in accordance with the vehicle system request, and starts charge. After that, the process proceeds to S609.

When the present time corresponds to the charge start time of the charge schedule in S616, the process proceeds to S617.

In S617, the charge ECU 47 immediately starts charge. When the start of the vehicle system request is provided in S618, the process proceeds to S619.

In S619, the charge ECU 47 immediately starts control for the vehicle in accordance with the vehicle system request. After that, the process proceeds to S609.

Figure 11:
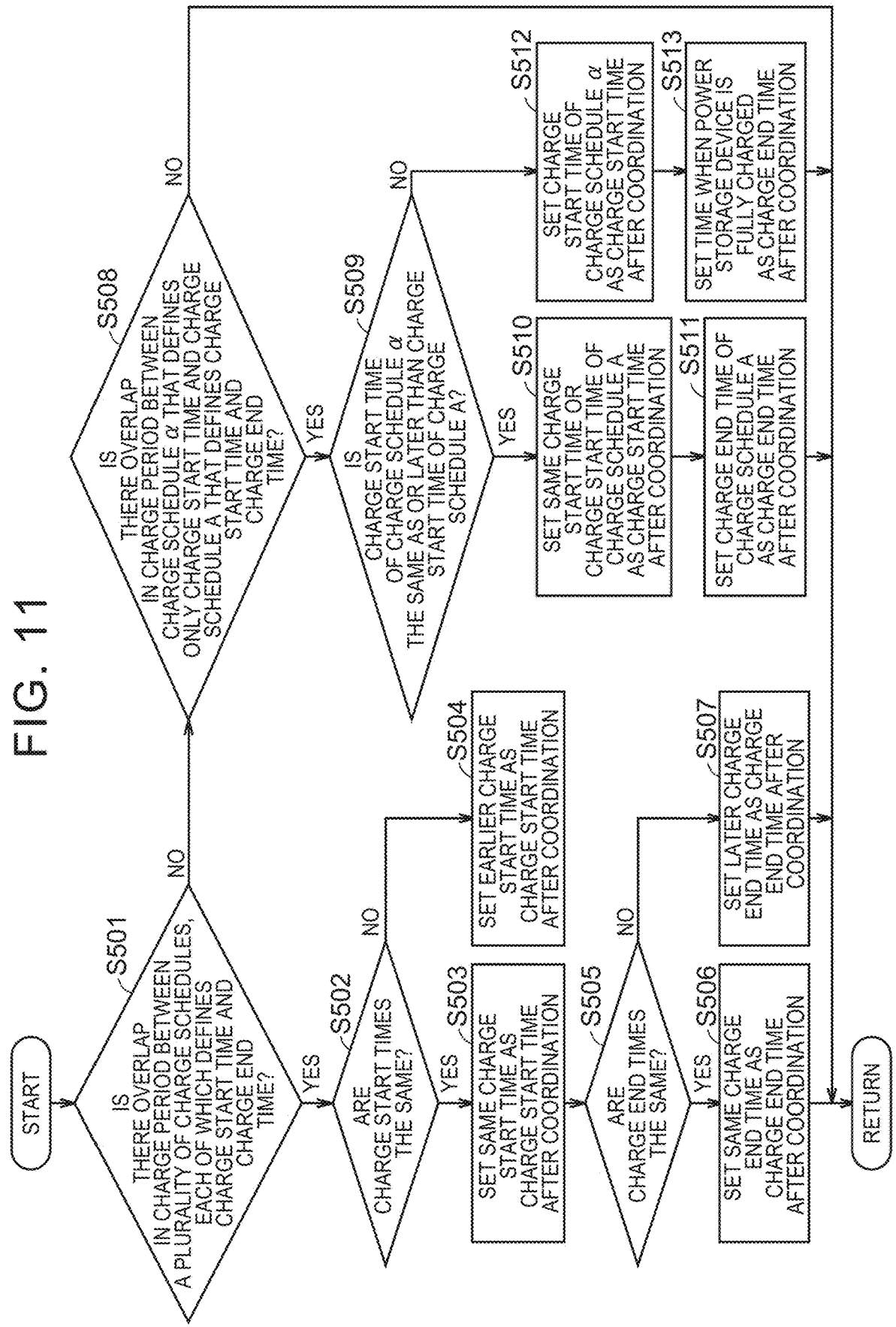
FIG. 11 is a flowchart illustrating the details of a process in S601 in FIG. 10.

FIG. 11 is a flowchart illustrating the details of the process in S601 in FIG. 10.

When there is overlap in charge period between/among a plurality of charge schedules, each of which defines a charge start time and a charge end time in S501, the process proceeds to S502. When there is no such overlap, the process proceeds to S508.

When the charge start times of the charge schedules are the same as each other in S502, the process proceeds to S503. When the charge start times of the charge schedules are different from each other in S502, the process proceeds to S504.

In S503, the charge ECU 47 sets the same charge start time as a charge start time after coordination.

In S504, the charge ECU 47 sets the earlier one of the charge start times as the charge start time after coordination.

When the charge end times of the charge schedules are the same as each other in S505, the process proceeds to S506. When the charge end times of the charge schedules are different from each other, the process proceeds to S507.

In S506, the charge ECU 47 sets the same charge end time as a charge end time after coordination.

In S507, the charge ECU 47 sets the later one of the charge end times as a charge end time after coordination.

When there is overlap in charge period between the charge schedule α that defines only a charge start time and the charge schedule A that defines a charge start time and a charge end time in S508, the process proceeds to S509.

When the charge start time of the charge schedule α is the same as or later than the charge start time of the charge schedule A in S509, the process proceeds to S510. When the charge start time of the charge schedule α is earlier than the charge start time of the charge schedule A in S509, the process proceeds to S512.

In S510, the charge ECU 47 sets the same charge start time or the charge start time of the charge schedule A that is the earlier as the charge start time after coordination.

In S511, the charge ECU 47 sets the charge end time of the charge schedule A as the charge end time after coordination.

In S512, the charge ECU 47 sets the charge start time of the charge schedule α that is the earlier as the charge start time after coordination.

In S513, the charge ECU 47 sets the time when the power storage device 10 is fully charged as the charge end time after coordination.

The embodiments disclosed herein should be construed as illustrative in all respects and not restrictive. The scope of the present disclosure is defined by the claims, rather than the above description, and is intended to include all modifications that fall within the meaning and scope of equivalence to the claims.

What is claimed is:

1. A vehicle comprising:
a power reception unit that receives power from an outside of the vehicle;
a power storage device;
a user input unit that receives setting of a schedule for timer charge; and
a control device that controls the timer charge in which the power storage device is charged using the power supplied from the outside of the vehicle in accordance with the schedule that is set,
wherein the control device is configured to, in a case where there is overlap between a charge time band of a first schedule that defines a first charge start time and a charge time band of a second schedule that defines a second charge start time and a second charge end time,
start charging at an earlier one of the first charge start time and the second charge start time when the first charge start time and the second charge start time are different from each other, and
end the charging at a charge end time which is determined based on whether the first schedule defines a first charge end time.

2. The vehicle according to claim 1, wherein the control device is configured to, in a case where there is overlap between the charge time band of the first schedule that defines the first charge start time and the first charge end time and the charge time band of the second schedule that defines the second charge start time and the second charge end time, end the charging at a later one of the first charge end time and the second charge end time when the first charge end time and the second charge end time are different from each other.

3. The vehicle according to claim 2, wherein the control device is configured to start the charging at a first time when the first charge start time and the second charge start time are same and are the first time, and to end the charging at a second time when the first charge end time and the second charge end time are same and are the second time.

4. The vehicle according to claim 1, wherein the control device is configured to, in a case where there is overlap between the charge time band of the first schedule that defines only the first charge start time and the charge time band of the second schedule that defines the second charge start time and the second charge end time,
start charging at the first charge start time and execute the charging until the power storage device is fully charged when the first charge start time is earlier than the second charge start time, and
start the charging at the second charge start time and end the charging at the second charge end time when the second charge start time is earlier than the first charge start time.

5. The vehicle according to claim 4, wherein the control device is configured to, in the case where there is overlap between the charge time band of the first schedule that defines only the first charge start time and the charge time band of the second schedule that defines the second charge start time and the second charge end time, start the charging at a first time and end the charging at the second charge end time when the first charge start time and the second charge start time are same and are the first time.

6. A vehicle comprising:
a power reception unit that receives power from an outside of the vehicle;
a power storage device;
a user input unit that receives setting of a schedule for timer charge;
an electric load device; and
a control device that controls the timer charge in which the power storage device is charged using the power supplied from the outside of the vehicle in accordance with the schedule that is set,
wherein the control device is configured to, when there is a my room mode request that requests use of the electric load device before a charge start time defined by the schedule, start charging and allow operation of the electric load device in accordance with the my room mode request.

7. The vehicle according to claim 6, wherein the control device is configured to control the charging and the operation of the electric load device in accordance with the schedule after the my room mode request is ended.

8. The vehicle according to claim 6, wherein:
the user input unit further receives setting of at least one other schedule for timer charge;
the control device controls the timer charge in which the power storage device is charged using the power supplied from the outside of the vehicle in accordance with the schedule and the at least one other schedule that are set; and
the control device is configured to:
coordinate the schedule and the at least one other schedule for the timer charge;
when there is the my room mode request during timer stand-by, execute operation of the electric load device and charging for the operation of the electric load device in accordance with the my room mode request; and
when there is a vehicle system request during the timer stand-by, keep the vehicle system request and the charging in a stand-by state, and when there is the vehicle system request during the charging, control the vehicle in accordance with the vehicle system request.

9. A vehicle comprising:
a power reception unit that receives power from an outside of the vehicle;
a power storage device;
a user input unit that receives setting of a schedule for timer charge; and
a control device that controls the timer charge in which the power storage device is charged using the power supplied from the outside of the vehicle in accordance with the schedule that is set,
wherein the control device is configured to, when there is a vehicle system request before a charge start time defined by the schedule, keep charging and control based on the vehicle system request in a stand-by state until the charge start time defined by the schedule.

10. The vehicle according to claim 9, wherein the control device is configured to start the charging and the control based on the vehicle system request at the charge start time and end the charging and the control based on the vehicle system request at a charge end time defined by the schedule.

11. The vehicle according to claim 10, further comprising a heater configured to raise a temperature of the power storage device, wherein the vehicle system request is a request to raise the temperature of the power storage device or a request to cool the power storage device.

12. The vehicle according to claim 9, further comprising a heater configured to raise a temperature of the power storage device, wherein the vehicle system request is a request to raise the temperature of the power storage device or a request to cool the power storage device.

* * * * *